(12) United States Patent
Nakajima (10) Patent No.: US 6,771,814 B1
(45) Date of Patent: Aug. 3, 2004

(54) IMAGE PROCESSING DEVICE AND IMAGE PROCESSING METHOD

(75) Inventor: Masato Nakajima, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 887 days.

(21) Appl. No.: 09/689,704

(22) Filed: Oct. 13, 2000

(30) Foreign Application Priority Data

Oct. 15, 1999 (JP) .......................................... P11-294474

(51) Int. Cl.[7] .............................................. G06K 9/00
(52) U.S. Cl. ....................... 382/168; 382/169; 382/274; 358/3.27
(58) Field of Search ................................. 382/168, 169, 382/171, 173, 254, 274, 270, 272; 358/3.27

(56) References Cited

U.S. PATENT DOCUMENTS

| | | | |
|---|---|---|---|
| 4,710,822 A | | 12/1987 | Matsunawa |
| 5,748,802 A | * | 5/1998 | Winkelman ................. 382/271 |
| 5,774,191 A | * | 6/1998 | Iverson ........................ 348/592 |
| 5,828,784 A | * | 10/1998 | Miyashita et al. .......... 382/232 |
| 6,097,849 A | * | 8/2000 | Nevis .......................... 382/274 |
| 6,163,621 A | * | 12/2000 | Paik et al. .................. 382/169 |
| 6,175,427 B1 | * | 1/2001 | Lehmbeck et al. .......... 358/1.9 |
| 6,205,257 B1 | * | 3/2001 | Eschbach .................... 382/261 |

FOREIGN PATENT DOCUMENTS

| | | |
|---|---|---|
| EP | 0 785 668 | 7/1997 |
| EP | 0 933 924 | 8/1999 |

OTHER PUBLICATIONS

"Fast Adaptive Contrast Enhacement Method for the Display of Gray Tone Images," *The Institute of Electronics, Information and Communication Engineers (IEICE) Transactions D–II*, vol. J77–D–II, No. 3, pp. 502–509, (1994).

* cited by examiner

Primary Examiner—Thomas D. Lee
(74) Attorney, Agent, or Firm—Nath & Associates PLLC

(57) ABSTRACT

In an image processing device (1), when receiving image data transferred from, for example a digital camera through an image input section (11), the region division section (13) divides the image data into a plurality of blocks having optimum sizes according to a degree of a similarity between density histograms of the blocks. A contrast enhancement section (14) obtains an optimum clip value per divided block and then obtains a density conversion curve based on the density histogram of the block including a target pixel by using the clip value in order to perform the density conversion for all of the pixels optimally. The image data that have been enhanced in contrast are compensated by a read compensation section (15) according to a property of a printing device (3) and then printed on a paper sheet.

11 Claims, 10 Drawing Sheets

DENSITY HISTOGRAMS
OF FOUR BLOCKS

IMAGE PROCESSING DEVICE AND IMAGE PROCESSING METHOD

CROSS-REFERENCE TO RELATED APPLICATION

This application is based upon and claims the benefit of priority from the prior Japanese Patent Application No. 11-294474, filed Oct. 15, 1999; the entire contents of which are incorporated herein by reference.

BACKGROUND OF THE INVENTION

1. Field of the Invention

The present invention relates to an image processing device and an image processing method capable of performing image processing to obtain output image data without any occurrence of a chromaticity differentiation loss and jump in brightness and with enhancing a contrast of the image when a printing device such as a printer outputs the image data on a printing paper. When a dark picture or a light picture is output from a color image output means such as a printer which is narrow in color reproduction range, the chromaticity differentiation loss occurs in a dark part and the jump in brightness occurs in a light part in image data. Conventionally, such chromaticity differentiation loss and/or jump in brightness are prevented by enhancing gradation of an image represented by the image data obtained by a color image read-out means such as an image scanner by carrying out contrast enhancement processing on the image data.

2. Description of the Related Art

Various types of printers and copier machines have been developed previously, these printers of an ink-jet type and a laser type are capable of inputting images data transferred from a personal computer and the like and then printing the image data on a printing paper and so on, and these copier machines are capable of reading optional image by using an optical reader and then printing the image data onto a printing paper.

The image printing devices such as these printers and copier machines perform a contrast enhancement process based on a histogram uniformity method in order to avoid the missing of detailed edge information about the edge of an original image.

There is a local histogram uniformity method as one of general contrast enhancement methods. Because this method performs the contrast enhancement in accordance with a local information about an image, this method can be efficiently applied to the process for natural images that require local information.

However, because this method calculates a mapping curve (a density-value conversion curve) per pixel that is obtained by accumulating the histogram of density values, this method causes a drawback to require an enormous time for the operation.

In order to eliminate this conventional drawback, for example, there is a high-speed local contrast enhancement method for natural images as a prior technique. In this technique, the mapping curve is obtained per region, not per pixel, in order to decrease the processing time to make the histogram, namely in order to perform the making of the histogram at a high speed.

Next, a description will be given of an outline of the conventional technique as written above:

(1) At first, a plurality of density conversion curves have been designed in advance;

(2) Second, suppose the histograms are concentrated around a mean density, and select the density conversion curve according to the mean density (selects the density conversion curve so that the contrast around the mean density may be enhanced); and (3) Finally, a linear interpolation for the density values is performed when the density conversion curves selected in adjacent regions are different.

By the way, in the conventional technique described above, although it has also been written that the density conversion curve is made per pixel, it is commonly and widely used to make the density conversion curve per block.

(A) Dividing input image into blocks, each block has a uniform size that has been experimentally determined.

(B) Following processes (B-1) to (B-3) are performed per block:

(B-1) Making a density histogram (in this case, each block is a reference region);

(B-2) Clipping the density histogram with a clip value that has been experimentally determined in order to obtain the density histogram after the clipping; and (B-3) Making an accumulated histogram obtained by accumulating the density histograms after the clipping.

(C) Performing a density conversion per pixel in each block based on the accumulated histogram as the density conversion curve.

In particular, when the density conversion curve for the block including the target pixel is different from the density conversion curves for adjacent blocks, the following linear interpolation processes (C-1) to (C-3) are performed for the density values.

(C-1) Converting the density value for a target pixel by using the density conversion curve that is made in the block B1 including the target pixel, and obtaining the density value "g1" after the conversion;

(C-2) Converting the density value of the target pixel by using the density conversion curves selected in each of the blocks B2, B3, and B4 that are mostly adjacent to this target pixel, and obtaining the density values g2, g3, and g4 after the conversion; and (C-3) Calculating the density value g(x,y) after the linear interpolation based on the following equation (1). (Each of the density values g1, g2, g3, and g4 after the conversion is weighted according to the distance from the center of each of the blocks B1, B2, B3, and B4 to the target pixel.)

$$g(x,y) = \{(J-j)/J\}\{(I-i)g1/I + ig2/I\} + j/J\{(I-i)g3/I + ig4/I\} \quad (1).$$

For the definition of each variable in the above-equation (1), see the detailed explanation for the same equation (1) that will be described in the "DETAILED DESCRIPTION OF THE PREFERRED EMBODIMENT" section.

However, in the conventional technique "A high-speed local contrast enhancement method for natural images" as written above, the reduction of the entire contrast of a target image occurs. For example, when a region A of a small area where the density value is low and a region B of a large area where the density value is high are mixed, and when the size of a reference area is then optimized based on the region A, the entire contrast of the region B is decreased and the contrast of a local area in the region B is enhanced.

On the contrary, when the size of the reference area is optimized based on the region B, because the size of the region A is very smaller than that of the reference area, the density information of the region A cannot be almost used when the histogram is calculated. This causes to decrease the slope of the density curve at a low density region and to decrease the contrast. After all, because the regions where the mapping curve is obtained are same, there is a drawback that it is difficult to set each region having an optimize size in the entire image to be processed.

Furthermore, it is preferable to determine a size of the reference area as a parameter to be used for determining the degree of enhancement for the detailed information, and a clip value as another parameter to be used for determining the degree of enhancement in the contrast according to the feature of a local region of the image. However, because there is no determination method to obtain these parameters in the prior technique, constant values as the parameters that have been experimentally obtained in advance are used. Therefore, it is desirable to automatically determine these parameters according to the feature of the local area of the target image.

According to the decreasing of the reference area, the wide-view contrast is also decreased because the local contrast is enhanced. On the contrary, according to the increasing of the reference area, the local contrast is also decreased because the wide-view contrast is enhanced. Furthermore, according to the increasing of the clip value, the degree of the enhancement is also increased, and according to the decreasing of the clip value, the degree of the enhancement is decreased.

Moreover, when the target image to be processed is switched, the above calculation for obtaining the optimum parameters must be repeated because the optimum parameters are also changed according to the switched image. This conventional drawback introduces inefficient calculation.

In addition to these conventional drawbacks, there is also a drawback in which an over-enhancement in contrast occurs when the dynamic range for the density in the image processing device is narrower than that of the original image, because it is necessary to use the image processing device with a wide dynamic range for the density,

SUMMARY OF THE INVENTION

Accordingly, an object of the present invention is, with due consideration to the drawbacks of the conventional technique, to provide an image processing device and an image processing method capable of automatically optimizing the block size of an reference area, of automatically performing an optimum enhancement of the contrast per region, and of easily obtaining output images without any occurrence of a chromaticity differentiation loss and jump in brightness, without any fearing of an unpleasantness, even if a non-skilled operator handles this image processing device and image processing method.

In accordance with a preferred embodiment of the present invention, an image processing device outputs image data to an output device. The image processing device comprises a region division means and a contrast enhancement means. The region division means inputs image data and for divides the input image data into a plurality of blocks, and further divides each block into a plurality of quasi blocks, and judges whether or not the further division is necessary for each block based on a degree of similarity of density histograms for the quasi blocks and sets quasi blocks as formal blocks based on the judgment. The judgment is repeated for all of the blocks in order to divide the input image data to the plurality of the blocks. The contrast enhancement means converts a density of each pixel in image data in each block obtained by the region division means based on a degree of enhancement in contrast according to a density property of each block.

In the image processing device of the present invention described above, the contrast enhancement means determines a clip value for each obtained block based on a slope of a tangent in proximity to a mean density of each obtained block on a property curve of an output system as the output device.

In the image processing device of the present invention described above, the contrast enhancement means determined a clip value for each obtained block based on a slope of a line that connects two points corresponding to a value of a mean density±dispersion of each obtained block on a property curve of an output system as the output device.

In the image processing device of the present invention described above, the contrast enhancement means performs a density conversion for pixels in a region corresponding to a boundary section of the blocks by using a density curve obtained by a linear compensation of the density curve of each block after each block of more than the minimum size has been divided so that each divided block is equal in size to the block having the minimum size.

In the image processing device of the present invention described above, the contrast enhancement means obtains a difference of mean densities of each pair of blocks that are adjacent to each other in all of the blocks, makes pairs in four blocks in up-down direction and right-left direction, the four blocks being composed of a block including a target pixel and three blocks that are mostly adjacent to the block including the target pixel, judges whether or not the difference of the mean densities of each pair of the blocks is not less than a threshold value that has been set in advance, and decreases a degree of the contrast enhancement according to the number of the pairs of the blocks, whose difference of each pair of the blocks is not less than the threshold value.

In accordance with another preferred embodiment of the present invention, an image processing device outputs image data to an output device. The image processing device comprises a region division means and a contrast enhancement means. The region division means inputs image data and divides the input image data into a plurality of blocks. The contrast enhancement means converts a density of each pixel in image data in each block obtained by the region division means based on a degree of enhancement in contrast according to a density property of each pixel. In the image processing device, the contrast enhancement means determines a clip value of each block based on a property curve of the output system as a property of the output device and a mean density of each block.

In accordance with another preferred embodiment of the present invention, an image processing method outputs image data to an output device. The image processing method comprises the steps of: dividing the input image data into a plurality of blocks; temporarily dividing each block into a plurality of quasi blocks; obtaining a density histogram of each quasi block; judging whether or not a further division is necessary for each block based on a degree of similarity of density histograms for the quasi blocks, and setting quasi blocks as formal blocks based on the judgment; and repeating the judgment for the further division for all of the blocks in order to divide the input image data to the plurality of the blocks.

In accordance with another preferred embodiment of the present invention, an image processing method outputs image data to an output device. The image processing method comprises the steps of: dividing input image data into a plurality of blocks; obtaining a mean value of density values of pixels in each obtained block; obtaining a clip value to determine a degree of enhancement in contrast for each block based on the mean value of the density of each obtained block and a property curve of an output system as a property of the output device; obtaining a density histogram of each obtained block; and making a density conversion curve for each obtained block based on the density histogram and the clip value of each obtained block, and converting all of pixels in density based on the density conversion curve.

The image processing method described above, further comprises the steps of obtaining a difference of mean densities of each pair of blocks that are adjacent to each other in all of the obtained blocks, making block pairs in four blocks in up-down direction and right-left direction, the four blocks being composed of a block including a target pixel and three blocks that are mostly adjacent to the block including the target pixel, judging whether or not the difference of the mean densities of each block pair is not less than a threshold value that has been set in advance, and decreasing a clip value to determine a degree of enhancement in contrast according to the number of the pairs of the obtained blocks whose difference of the mean densities is not less than the threshold value.

In the image processing method described above, the blocks, whose size is greater than that of the block of the minimum size, located in a boundary region of the blocks are divided according to the block of the minimum size, and the density conversion is performed for pixels by using a density curve obtained by a linear compensation of the density curve of each divided block.

According to the present invention, input image are divided into a plurality of blocks automatically. At this time, it is judged whether or not the block is further divided according to a degree of the similarity of the density histograms of the blocks. If it is necessary to further divide the block, this block is divided into a plurality of blocks each having a small size. The division operation is repeated for all of the blocks. As a result, the input image is divided automatically into the blocks each having the optimum size. After the division process, the degree of enhancement in contrast is automatically determined per block in order to perform the density conversion for all of pixels. In this case, the mean density of the density values of pixels in each block is obtained, and then an optimum clip value to determine the degree of enhancement in contrast is automatically obtained per block according to the mean density per block and the property curve of an output system such as a printer. Then, the density conversion curve per block is made based on the density histogram and the clip value of each block and then the density conversion is performed for all of the pixels. Thereby, it is possible for an unskilled operator to perform the contrast enhancement of the input image data optimally.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 3 is a diagram showing an explanation for a region division operation performed by a region division section shown in FIG. 1;

DESCRIPTION OF THE PREFERRED EMBODIMENTS

Other features of this invention will become apparent through the following description of preferred embodiments which are given for illustration of the invention and are not intended to be limiting thereof.

First Embodiment

Figure 1:
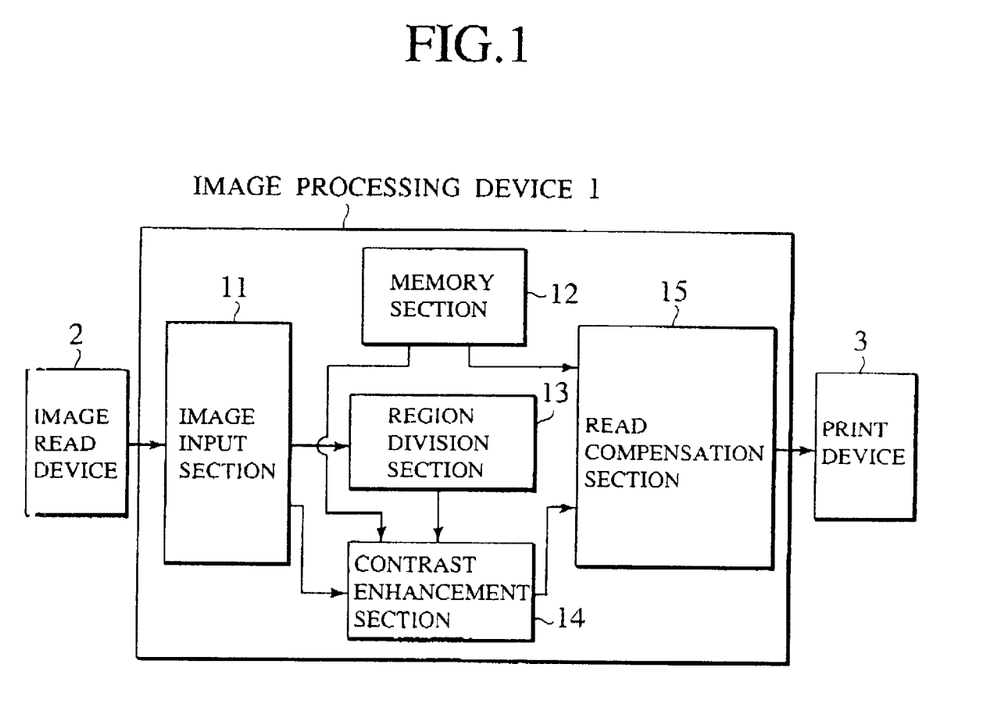
FIG. 1 is a block diagram showing a configuration of the image processing device according to the first embodiment of the present invention.

FIG. 1 is a block diagram showing the configuration of the image processing device according to the first embodiment of the present invention. In FIG. 1, a printing device 3 is connected to the image processing device 1. This printing device 3 is located at the following stage of the image processing device 1, and outputs a processed image onto a printing sheet.

The image processing device 1 comprises an image input section 11 for inputting image data which has been taken by a digital camera, for example, a memory section 12 for storing a property curve of an output system showing a property of the output system and for storing a compensation curve of the output system obtained by converting in reverse the property curve of the output system, a region division section 13 for dividing regions according to the feature of the image data to be processed in a local region, a contrast enhancement section 14 for performing various processes to execute an optimize enhancement for the contrast per region by using the compensation curve of the output system that has been prepared in advance, and a reading compensation section 15 for compensating the density of the image data by using the property curve of the output system.

Next, a description will be given of the operation of the preferred embodiment.

Figure 2:
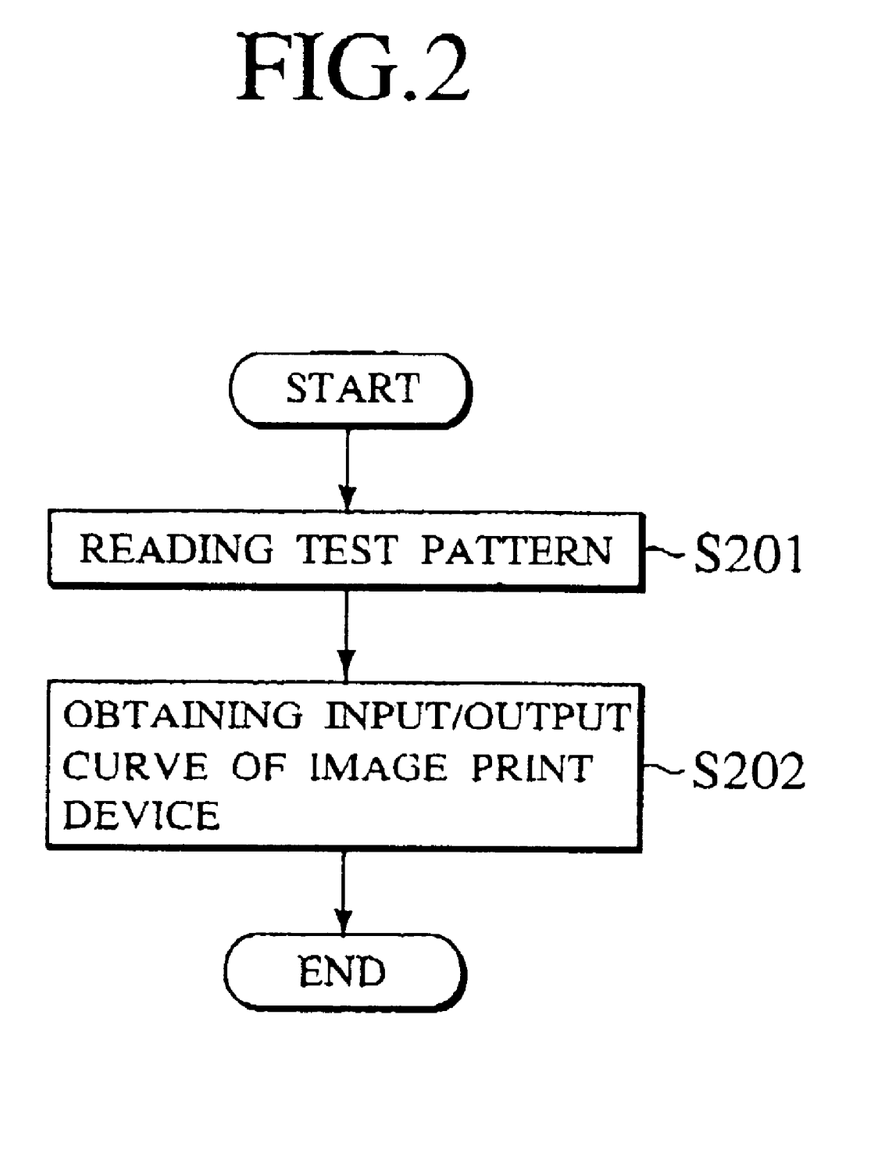
FIG. 2 is a flow chart showing the procedure to obtain a property curve of an output system, which is stored into a memory section shown in FIG. 1.

FIG. 2 is a flow chart showing the procedure to obtain the property curve of the output system, which is stored into the memory section 12.

At first, in order to obtain the property curve and the compensation curve of the output system to be stored into the memory section 12 in the image processing device 1, the process shown in FIG. 2 is performed in advance.

At Step S201, a density dynamic range of the printing device 3 is measured quantitatively.

Figure 3:
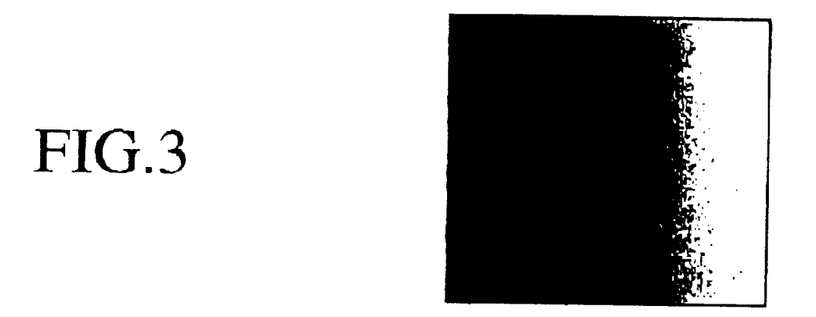
FIG. 3 is a diagram showing an example of a test pattern to be used when the property curve of the output system is obtained.

FIG. 3 is a diagram showing an example of a test pattern to be used for obtaining the property curve of the output system. The printing device 3 outputs this test pattern shown in FIG. 3, and printed test pattern is then analyzed in order to obtain the property curve of the output system as the property of the printing device 3 at Step S202.

Figure 4:
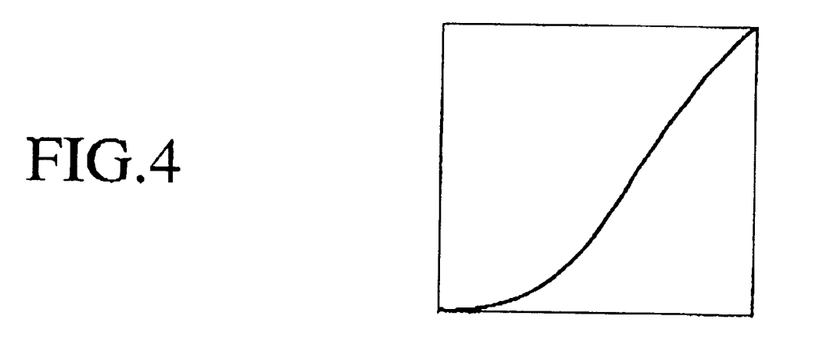
FIG. 4 is a property diagram showing an example of a property curve to be stored into the memory section shown in FIG. 1.
Figure 5:
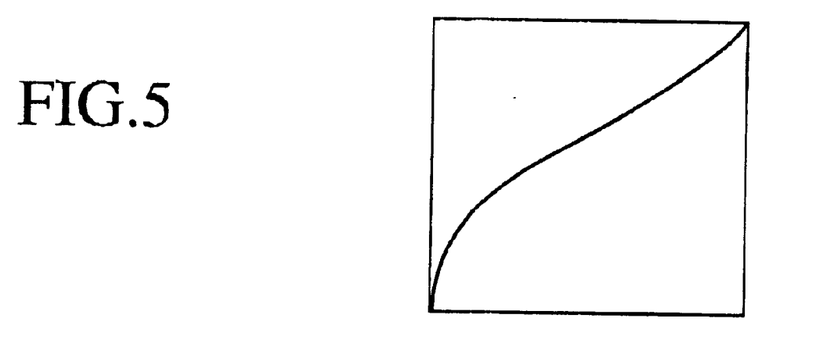
FIG. 5 is a property diagram showing an example of a compensation curve of the output system to be stored into the memory section shown in FIG. 1.

FIG. 4 is a property diagram showing an example of the property curve of the printing device 3 as the output system obtained at Step S202. The compensation curve of the output system shown in FIG. 5 is obtained based on the input/output property so that the density of the original image is almost equal to the density of the printed image, namely, so that there is no difference of the density information between the original image and the printed image. Both the property curve and the compensation curve of the output system are stored into the memory section 12.

Figure 6:
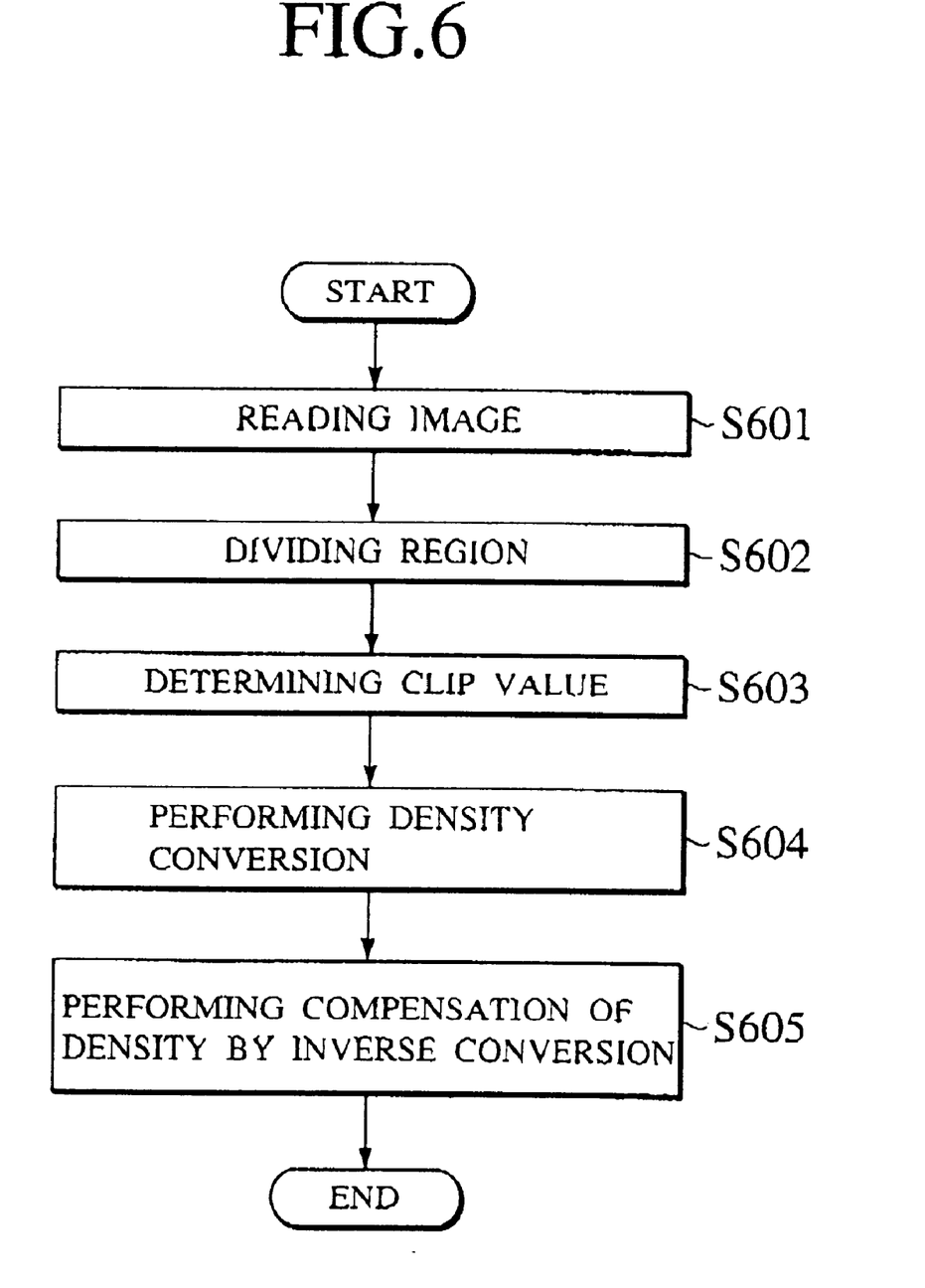
FIG. 6 is a flow chart showing an image processing procedure of the image processing device shown in FIG. 1.

Next, a description will be given of the operation of the image processing device 1 of the preferred embodiment with reference to the flow chart of FIG. 6.

The image processing device 1 performs the process to enhancement the contrast for the target image to be printed so that the information of small edges in the target image are not eliminated by noise of the printing device 3.

At first, the image input section 11 in the image processing device 1 inputs and temporarily stores the image data (as the target image to be printed) transferred from outside to an image memory (not shown) at Step S601, and then outputs the image data to both the region division section 13 and the contrast enhancement section 14.

After this step S601, the region division section 13 divides the image to be printed into a plural blocks (as regions) automatically at Step S602. The contrast enhancement section 14 determines a clip value as a parameter in order to determine the degree of the contrast enhancement at Step S603.

Here, a description will be given of the explanation about the local histogram uniformity method with reference to the diagrams in order to easily understand the feature of the preferred embodiment.

Figure 7:
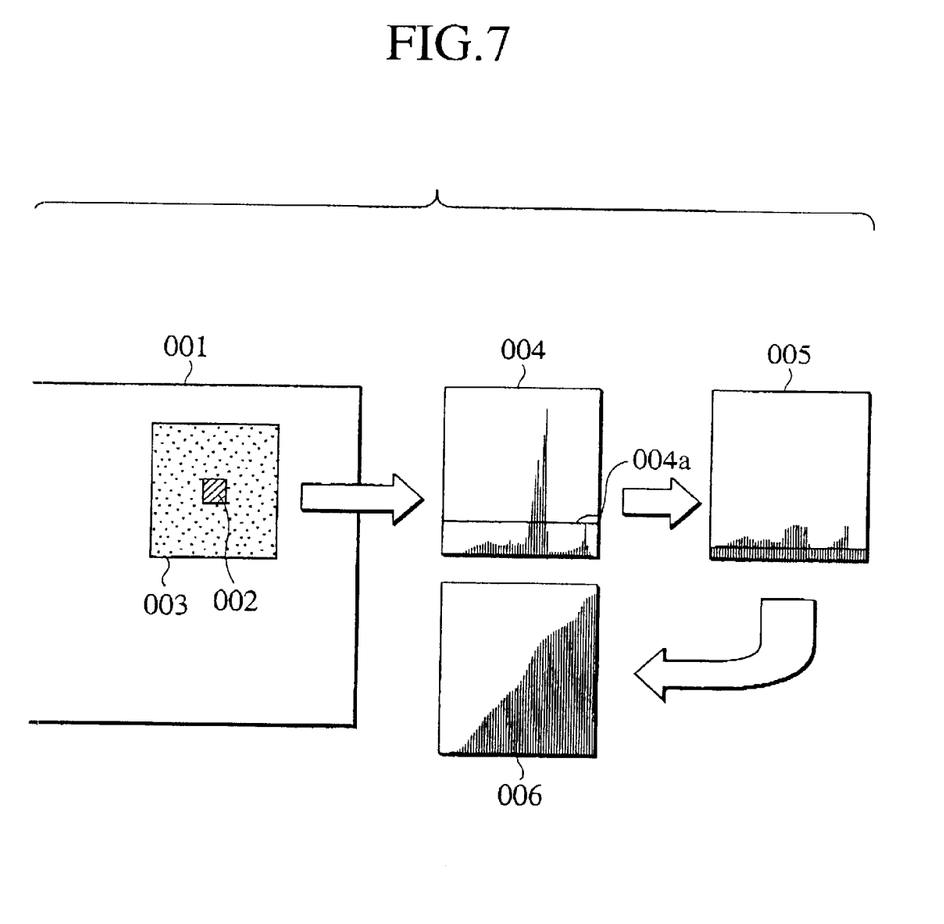
FIG. 7 is a diagram showing an explanation of a method of obtaining a density conversion curve per pixel by applying a histogram uniformity method to a local area.

At first, as shown in FIG. 7, a reference region 003 having a desired size is formed around the target pixel 002 in the image 001 to be converted in density. Then, the density histogram 004 of pixels in the reference region 003 is made.

Then, in order to suppress any occurrence of over-enhancement, pixels whose frequency in the histogram 004 is over a desired clip value 004a are clipped, and these clipped pixels are distributed equally onto other pixels in order to obtain the histogram 005.

The histogram 006 that is obtained by accumulating the frequencies in the histogram 005 is normalized in order to obtain the density conversion curve. Then, the density conversion for the target pixel is performed. However, in the current state, the processing requires an enormous calculation time because it is necessary to calculate the density histogram for all of the pixels in the target image data.

Figure 8:
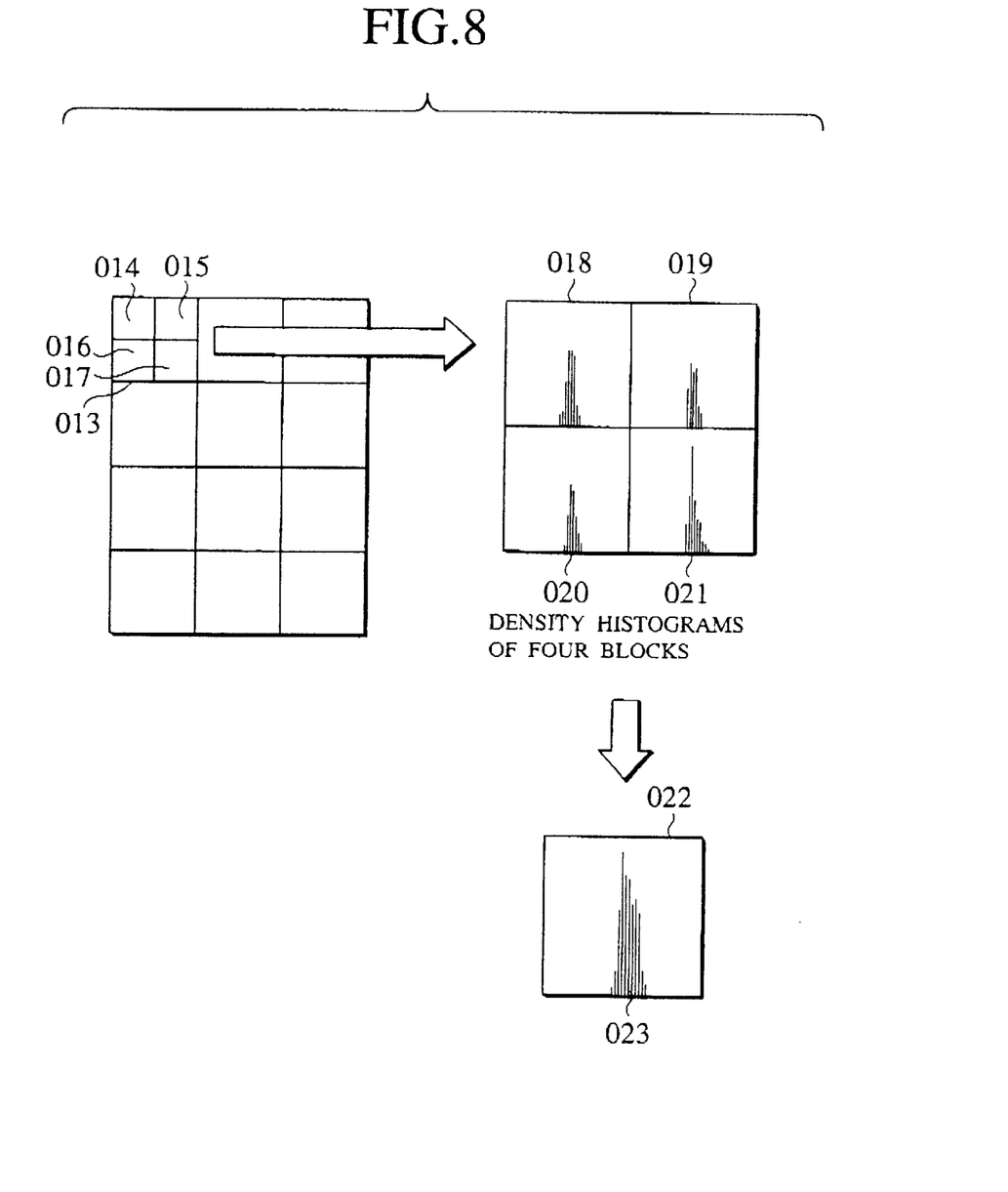

In order to reduce the processing time, the region division section 13 in the image processing device 1 of the preferred embodiment divides the image to be processed into plural blocks 013, 014, 015, 016, 017, . . . , as shown in FIG. 8, and then the same density conversion curve is used for the pixels in the same block at Step S602. This causes to decrease the processing time, like the conventional case. Furthermore, because the regions having both a low density value and a high density value may be localized in the image to be processed, the entire image to be processed is divided into the square blocks having different sizes at Step S602, as shown in FIG. 8.

Because the same density conversion curve is used in the same square block during this block division processing, it is desirable to divide a region having a different property into another block. Accordingly, as shown in FIG. 8, the following procedure is performed.

(1) The entire image to be processed is divided into the blocks (these blocks are referred to as a large block) having a same size.

(2) By the following procedure, it is determined whether or not the obtained large block, for example. the large block 013, is divided.

(2-1) The large block 013 is divided temporarily into four quasi blocks having a same size (these blocks having this size are referred to as intermediate blocks);

(2-2) The density histograms 018, 019, 020, and 021 are made for the quasi blocks 014, 015, 016, and 017, respectively;

(2-3) Like the histogram 022 shown in FIG. 8, the density histograms 018, 019, 020, and 021 are overlapped, and then the area "S" of the section 023 (that is the overlapped section) is compared with a threshold value "T" that has been experimentally set in advance. As a result, when the area "S" is not less than the threshold value "T", these quasi blocks 014, 015, 016, and 017 are integrated into the large block 013 because the four quasi blocks 014, 015, 016, and 017 have a higher similarity. That is, it is determined that the large block 013 is not divided. On the other hand, when the area "S" is smaller than the threshold value "T", the four quasi blocks 014, 015, 016, and 017 will be used as the intermediate blocks, because these guasi blocks 014, 015, 016, and 017 have a low similarity. (2-4) After this, these processes (2-1) to (2-3) is repeated for all of the large blocks.

(3) After the term "large block" is switched to the term "intermediate block", the above-described processes (2-1) to (2-4) in the procedure (2) are performed for all of the intermediate blooks obtained at the procedure (2). When it is determined to execute the division, the intermediate block is divided into plural small blocks.

Although the three types of blocks, the large block, the intermediate block. and the small block are used in the above explanation, the present invention is not limited by this procedure, for example, it is possible to performs the above processes periodically, and to use a plurality of division stages.

By the way, because the density conversion curves are different around the boundary section of each block when the block division shown in FIG. 8 is performed, the density values are discontinued. This discontinuation of the density values causes a block noise.

Figure 9:
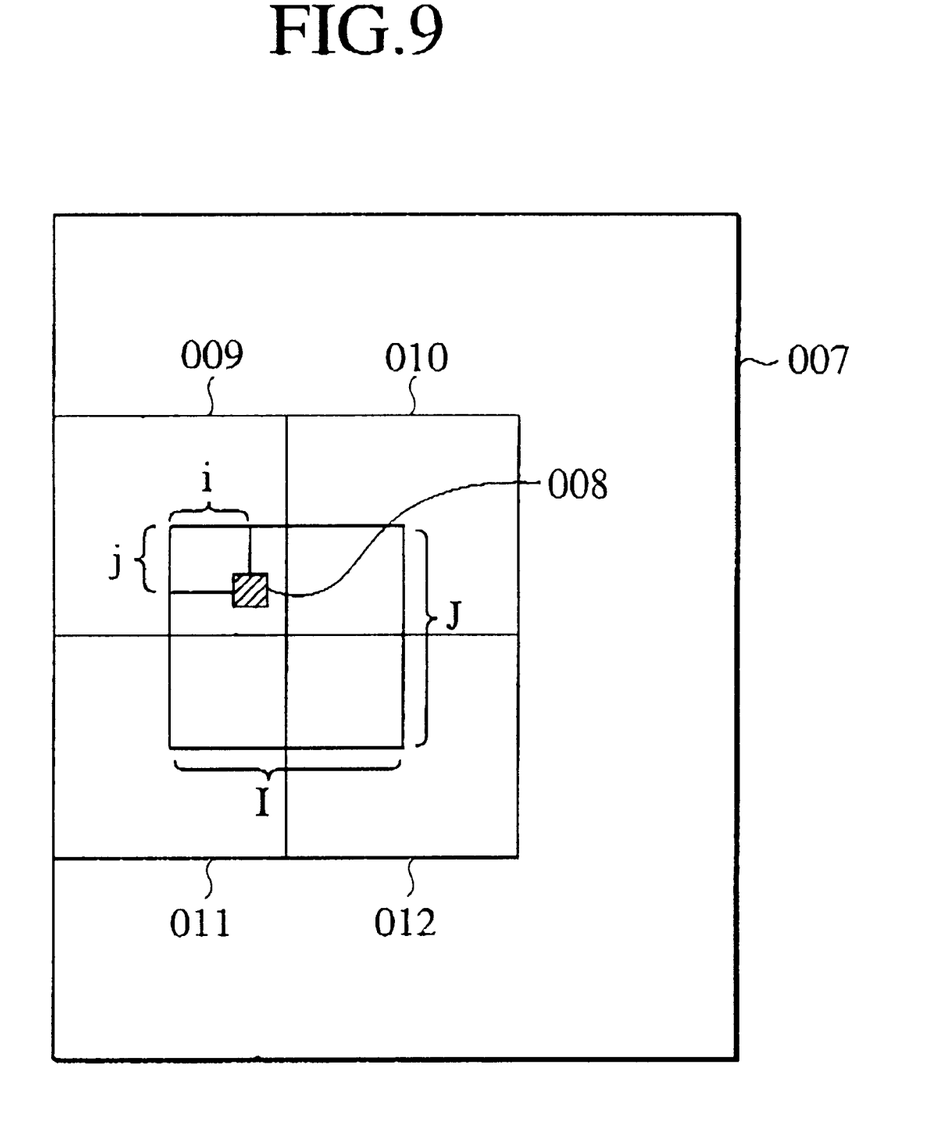
FIG. 9 is a diagram showing an explanation of an interpolation method in order to avoid any occurrence of a non-contiguous density value at a boundary section of blocks having a constant size.

In order to avoid the noise, as shown in FIG. 9. the proportional distribution of the density conversion curves is used for the peripheral four blocks 009, 010, 011, and 012. By using this proportional distribution, the output value g(x,y) of the target pixel 008 can be expressed by the following equation (1).

$$g(x,y) = \{(J-j)/J\}\{(I-i)g1/I + ig2/I\} + j/J\{(I-i)g3/I + ig4/I\} \quad (1),$$

where "g1" to "g4" are density values that are converted by using the density conversion curves obtained based on the block including the target pixel and the four blocks mostly adjacent to the target pixel, each of "J" and "I" is the length of each side of the square including the target pixel shown in FIG. 9, and each of "i" and "j" is the position of the target pixel 008 based on a top point (as a standard point) of this square.

Figure 10:
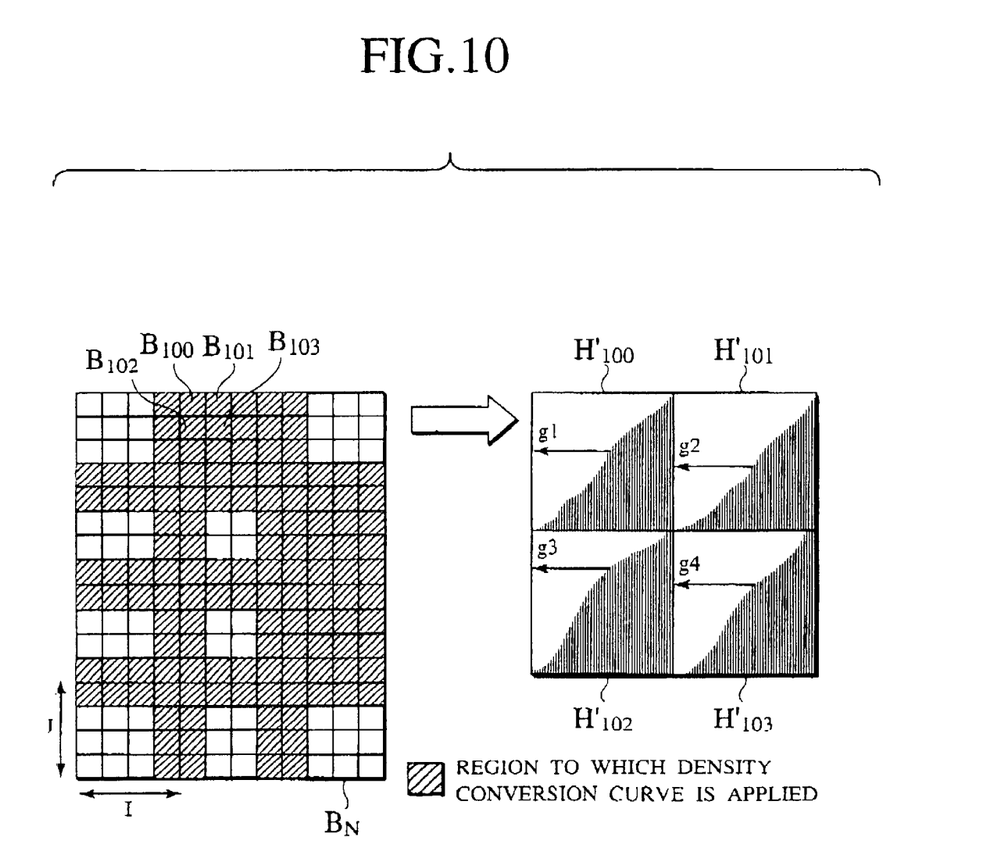
FIG. 10 is a diagram showing an explanation of another interpolation method in order to avoid any occurrence of a non-contiguous density value at a boundary section of blocks having a different size.

When the sizes of the blocks around the target pixel 008 are different, the large blocks and the intermediate blocks are divided temporarily based on the size of the small block, and the equation (1) is used for the density conversion of the pixels in the boundary regions of the blocks shown by the oblique lines (see FIG. 10) in order to avoid occurrence of any block noise.

The contrast enhancement section 14 uses the same clip value for each block divided by the region division section 13. The clip value is the parameter to determine the degree of the contrast enhancing. For example, when the clip value is a large value, the enhancement becomes large, and when the clip value is zero, no enhancement is performed.

Figure 11:
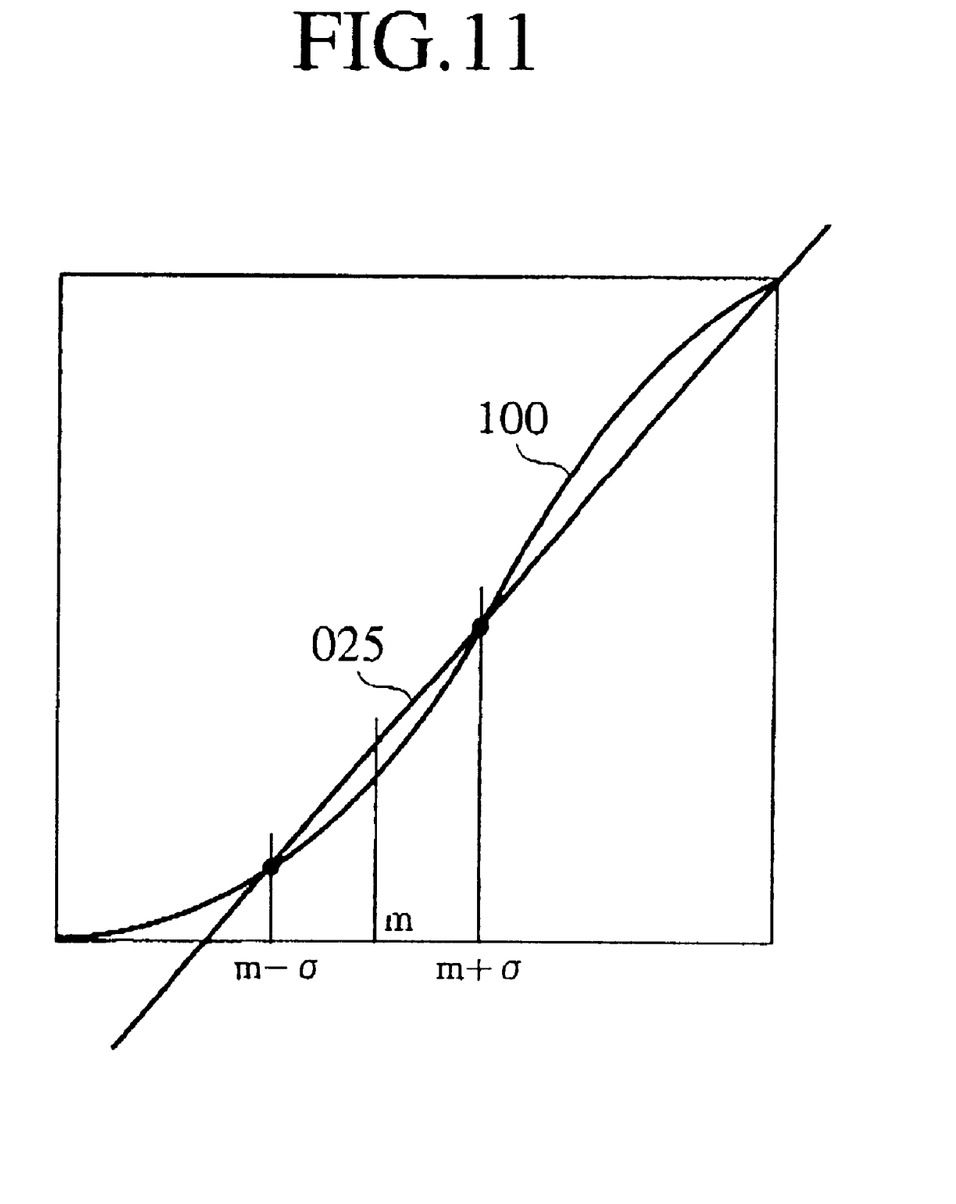
FIG. 11 is a diagram showing an explanation of a method of obtaining a clip value by a contrast enhancement section shown in FIG. 1.

In this determination method, a mean density "m" of the pixels in the block and the density dispersion "$\sigma^2$" are obtained, and then the clip value is determined by comparing these values with the property curve shown in FIG. 11 (as the property of the printer) that is stored in the memory section 12.

Concretely, as shown in FIG. 11, because it may be considered that the density value of the pixel in the block is locally plotted between (m−σ) and (m+σ). That is, it may be determined that the dynamic range is wide when the slope of the line 025 (that is equal to the mean density±the dispersion) made by these two points is greater. That is, it is possible to have the large number of gradations of the output against the small number of gradations of the input.

Therefore, the contrast enhancement section 14 determines at Step S603 that the dynamic range in the block is wide and the loss of the information is low. The contrast enhancement section 14 then sets the clip value to a small value. On the contrary, when the slope of the line 025 is small, the contrast enhancement section 14 determines at Step S603 that the loss of the information is large, so that the contrast enhancement section 14 obtains an optimum clip value per block so that the clip value becomes large.

Figure 12:
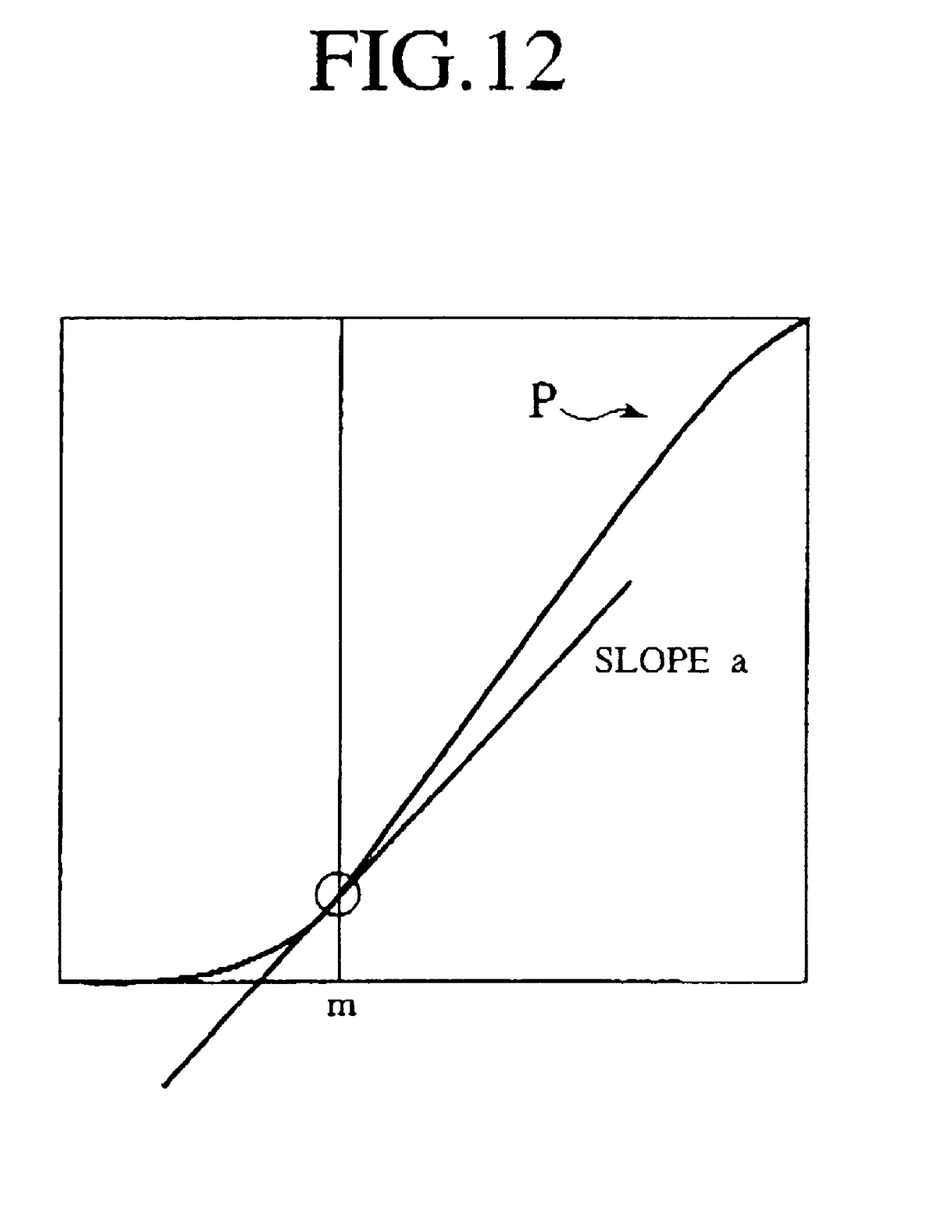
FIG. 12 is a diagram showing an explanation of another method of obtaining a clip value by the contrast enhancement section shown in FIG. 1.

The contrast enhancement section 14 can obtain the optimum clip value only by using the mean density. In this case, the contrast enhancement section 14 calculates the slope of the tangent "a" at the point corresponding to the mean density "m" of the input on the property curve "P" of the output system shown in FIG. 12, and references the relationship between the slope of the tangent that has been determined in advance and the clip value, and thereby obtain the optimum clip value corresponding to the slope of the tangent "a".

By the way, the method to determine the optimum clip value by using the mean density "m" and the density dispersion "$\sigma^2$" has the feature to eliminate the noise of the property curve of the output system, when compared with the method to determine the clip value only by using the mean density "m". Contrary to this, the method to determine the clip value only by using the mean density "m" has the feature to decrease the amount of the calculation.

The point indicating the mean density "m" is not limited only by one, it is possible to use values that are in close to the mean density "m" within a negligible amount of error in order to obtain the optimum clip value.

After this step, the contrast enhancement section 14 makes the density conversion curves based on the density histogram of the block including the target pixel in order to perform the density conversion for all of the pixels.

When the density conversion curves of the blocks that are adjacent to each other are greatly different, namely when the features of these blocks are greatly different, the contrast enhancement section 14 decreases the clip values because the different of the contrasts are adequately large, and thereby it is not necessary to enhance the contrasts. Concretely, in the four blocks, blocks including the target pixel and three other blocks that are adjacent to the block including the target pixel, when the difference of the mean densities of the two blocks that are adjacent in right-left direction and up-down direction is not less than the threshold value that has been set in advance, the contrast enhancement section 14 decreases the clip value by a desired value. When the difference of the mean densities of one pair of the blocks is not less than the threshold value, the contrast enhancement section 14 decreases the clip value by ¼, when the difference of the mean densities of each pair in all pairs in the four blocks in up-down direction and right-left direction is over the threshold value, the contrast enhancement section 14 sets the clip value to zero.

In this case, the contrast enhancement section 14 calculates the difference of the mean densities of each pair of the blocks that are adjacent to each other in all pairs of the blocks, makes the pair of the blocks in the four blocks, namely, blocks including the target pixel and three other blocks mostly adjacent to the target pixel. The contrast enhancement section 14 then judges whether the difference of the mean densities of each pair of the blocks in these four blocks in up-down direction and right-left direction is not less than the threshold value that has been set in advance, and then decreases the clip value by a desired amount according to the number of the pairs having the difference of the mean densities not less than the threshold value in order to suppress the contrast enhancing.

The contrast enhancement section 14 transfers the target image that has been processed by the contrast enhancement treatment to the read compensation section 15. At Step S605, the read compensation section 15 performs the inverse conversion operation of the density for the printing device 3 in order to suppress an absolute difference of the information between the original image and the target image to be printed by using the compensation curve of the output system that is stored in the memory section 12 shown in FIG. 5. Then, the read compensation section 15 transfers the obtained image data to be printed to the printing device 3. The printing device 3 prints the received printing image data on a printing paper.

As described above, according to the image processing device and the image processing method of the preferred embodiment, the region division section 13 divides the target image to be printed into a plurality of blocks having a desired size automatically, and the contrast enhancement section 14 determines an optimum clip value for each of these divided blocks automatically in order to perform the enhancing treatment for the contrast per block. Accordingly, it is possible to obtain the image data to be printed having an optimum contrast that has been enhanced easily and rapidly without any skill of an operator.

In addition, because the size of the block that requires the density conversion curve is set to an optimum size according to the change of the density of the target image, it is possible to enhance the entire contrast of the image to be printed optimally.

Furthermore, because the clip values are decreased in order to suppress the enhancement of the contrast when all of the mean density values of the adjacent blocks are over a constant value, it is possible to eliminate any occurrence of over-enhancement in contrast. By these effects described above, even if the density dynamic range of the printing device 3 is narrower than that of image data to be printed, it is possible to eliminate any occurrence of missing any information of the image data, and thereby possible to easily obtain the output image data without any occurrence of a chromaticity differentiation loss and jump in brightness.

Moreover, the preferred embodiment described above has explained the printing device such as an ink-jet printer, a laser printer, and the like having the function to print the output image transferred from personal computers. The present invention is not limited by this preferred embodiment, for example, it is possible to apply the concept of the present invention to optical reading machines such as copier machines capable of reading optional images and this can also obtain the same effect.

Furthermore, the present invention can be applied to the configuration of the system comprising a scanner, the image processing device 1, and a printer (whose configuration is not limited, for example, it is possible to separate in configuration the printer from the image processing device, and also possible that the printer is incorporated into the image processing device.) in which the image processing device is connected to the scanner and the image reading section 11 reads the image data transferred from the scanner.

As set forth, according to the present invention. it is possible to optimize the size of each block automatically when an input image is divided, and possible to perform the optimum contrast enhancement for the entire of the image to be processed.

Furthermore, according to the present invention, it is possible to obtain the clip value as the parameter to automatically determine the degree of the enhancement per block by using the mean density and the property curve of the output system per block.

Moreover, according to the present invention, because the mean density and the dispersion is calculated per block and the clip value is obtained by using the mean density, the dispersion, and the property curve of the output system, it is possible to more eliminate the influence of the noise on the property curve of the output system when compared with the case using only the mean density.

Furthermore, according to the present invention, it is possible to increase the quality of the output image because the block noise can be eliminated.

Moreover, according to the present invention, it is possible to output the natural image because any occurrence of over-enhancement in contrast can be avoided.

Furthermore, according to the present invention, it is possible to automatically divide input image to a plurality of blocks each having an optimum size.

Moreover, according to the present invention, it is possible to automatically obtain the optimum clip value per block as a parameter for determining the degree of enhancement in contrast for the block, and because it is also possible to optimally and automatically enhance the contrast of each block based on the parameter, it is possible for an unskilled operator to easily obtain the output image without any occurrence of a chromaticity differentiation loss and jump in brightness and with stability.

While the above provides a full and complete disolosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. An image processing device for outputting image data to an output device, comprising:

region division means for inputting image data and for dividing the input image data into a plurality of blocks, and for further dividing each block into a plurality of quasi blocks, and for judging whether or not the further division is necessary for each block based on a degree of similarity of density histograms for the quasi blocks and setting quasi blocks as formal blocks based on the judgment, and the judgment is repeated for all of the blocks in order to divide the input image data to the plurality of the blocks; and contrast enhancement means for converting a density of each pixel in image data in each block obtained by the region division means based on a degree of enhancement in contrast according to a density property of each block.

2. An image processing device for outputting image data to an output device, according to claim 1, wherein the contrast enhancement means determines a clip value for each obtained block based on a slope of a tangent in proximity to a mean density of each obtained block on a property curve of an output system as the output device.

3. An image processing device for outputting image data to an output device, according to claim 2, wherein the contrast enhancement means obtains a difference of mean densities of each pair of blocks that are adjacent to each other in all of the blocks, makes pairs in four blocks in up-down direction and right-left direction, the four blocks being composed of a block including a target pixel and three blocks that are mostly adjacent to the block including the target pixel, judges whether or not the difference of the mean densities of each pair of the blocks is not less than a threshold value that has been set in advance, and decreases a degree of the contrast enhancement according to the number of the pairs of the blocks, whose difference of each pair of the blocks is not less than the threshold value.

4. An image processing device for outputting image data to an output device, according to claim 1, wherein the contrast enhancement means determined a clip value for each obtained block based on a slope of a line that connects two points corresponding to a value of a mean density ± a dispersion of each obtained block on a property curve of an output system as the output device.

5. An image processing device for outputting image data to an output device, according to claim 4, wherein the contrast enhancement means obtains a difference of mean densities of each pair of blocks that are adjacent to each other in all of the blocks, makes pairs in four blocks in up-down direction and right-left direction, the four blocks being composed of a block including a target pixel and three blocks that are mostly adjacent to the block including the target pixel, judges whether or not the difference of the mean densities of each pair of the blocks is not less than a threshold value that has been set in advance, and decreases a degree of the contrast enhancement according to the number of the pairs of the blocks, whose difference of each pair of the blocks is not less than the threshold value.

6. An image processing device for outputting image data to an output device, according to claim 1, wherein the contrast enhancement means performs a density conversion for pixels in a region corresponding to a boundary section of the blocks by using a density curve obtained by a linear compensation of the density curve of each block after each block of more than the minimum size has been divided so that each divided block is equal in size to the block having the minimum size.

7. An image processing device for outputting image data to an output device, comprising:

region division means for inputting image data, and for dividing the input image data into a plurality of blocks; and contrast enhancement means for converting a density of each pixel in image data in each block obtained by the region division means based on a degree of enhancement in contrast according to a density property of each pixel, wherein the contrast enhancement means determines a clip value of each block based on a property curve of the output system as a property of the output device and a mean density of each block.

8. An image processing method of outputting image data to an output device, the image data being obtained by enhancement input image data in contrast, comprising the steps of:

dividing the input image data into a plurality of blocks;

temporarily dividing each block into a plurality of quasi blocks;

obtaining a density histogram of each quasi block;

judging whether or not a further division is necessary for each block based on a degree of similarity of density histograms for the quasi blocks, and setting quasi blocks as formal blocks based on the judgment; and repeating the judgment for the further division for all of the blocks in order to divide the input image data to the plurality of the blocks.

9. An image processing method of outputting image data to an output device, comprising the steps of:

dividing input image data into a plurality of blocks;

obtaining a mean value of density values of pixels in each obtained block;

obtaining a clip value to determine a degree of enhancement in contrast for each block based on the mean value of the density of each obtained block and a property curve of an output system as a property of the output device;

obtaining a density histogram of each obtained block; and making a density conversion curve for each obtained block based on the density histogram and the clip value of each obtained block, and converting all of pixels in density based on the density conversion curve.

10. An image processing method of outputting image data to an output device, according to claim 9, further comprises the steps of:

obtaining a difference of mean densities of each pair of blocks that are adjacent to each other in all of the obtained blocks;

making block pairs in four blocks in up-down direction and right-left direction, the four blocks being composed of a block including a target pixel and three blocks that are mostly adjacent to the block including the target pixel;

judging whether or not the difference of the mean densities of each block pair is not less than a threshold value that has been set in advance; and decreasing a clip value to determine a degree of enhancement in contrast according to the number of the pairs of the obtained blocks whose difference of the mean densities is not less than the threshold value.

11. An image processing method of outputting image data to an output device, according to claim 9, wherein the blocks, whose size is greater than that of the block of the minimum size, located in a boundary region of the blocks are divided according to the block of the minimum size, and the density conversion is performed for pixels by using a density curve obtained by a linear compensation of the density curve of each divided block.

\* \* \* \* \*